Patented Aug. 5, 1941

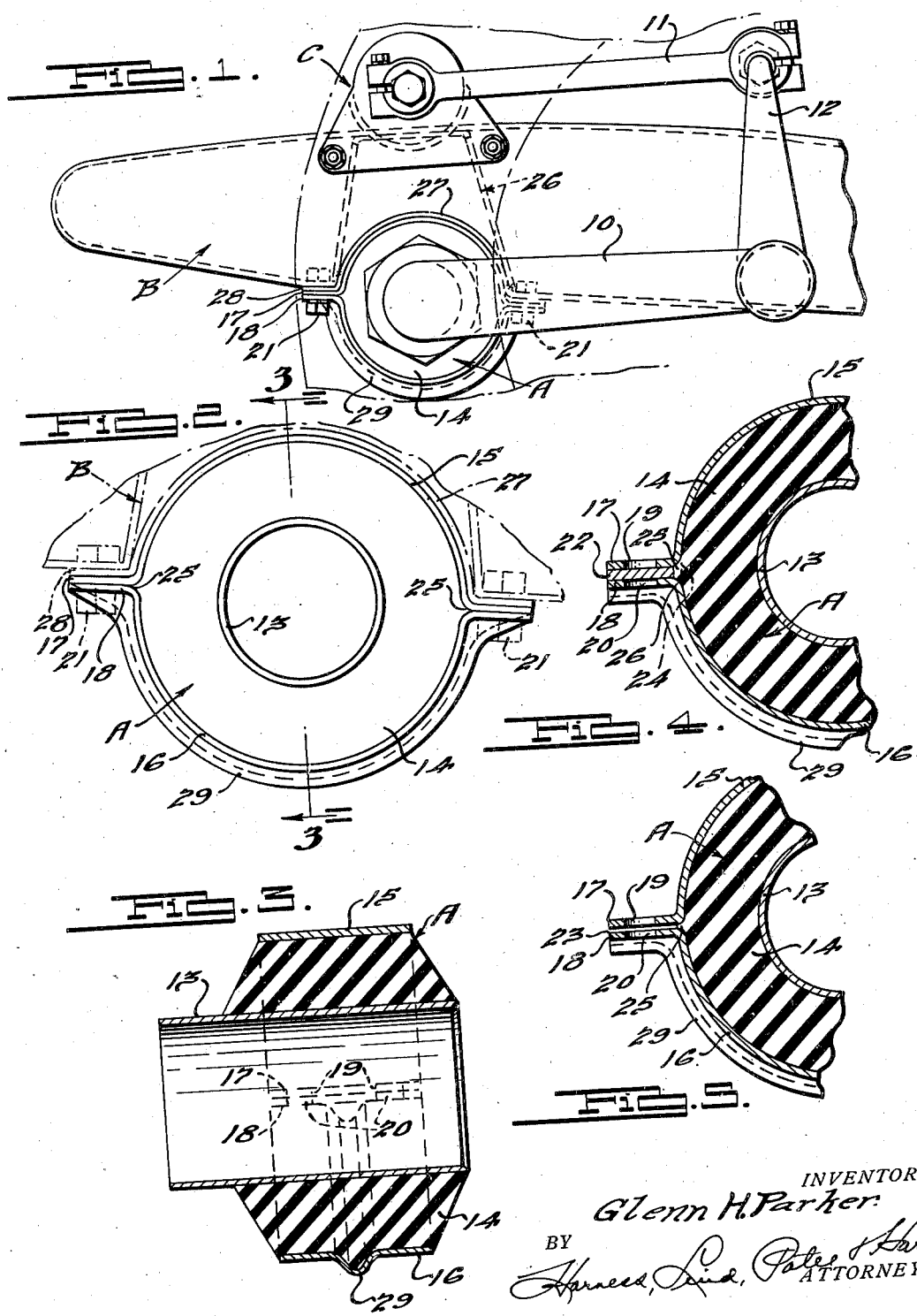

2,251,417

UNITED STATES PATENT OFFICE

2,251,417

METHOD OF MAKING TORSION SPRINGS

Glenn H. Parker, Royal Oak, Mich., assignor to Chrysler Corporation, Highland Park, Mich., a corporation of Delaware Original application March 1, 1939, Serial No. 259,202. Divided and this application October 26, 1939, Serial No. 301,480

1 Claim. (Cl. 29—149.5)

This invention relates to torsion springs of the type embodying non-metallic bodies such as rubber composition or other suitable plastic material and is a division of my copending application Serial No. 259,202, filed March 1, 1939.

My invention is especially adapted for use in conjunction with ground wheels of motor vehicles, the torsion springs preferably serving to yieldingly support the vehicle structure on the ground wheels. In such arrangements the torsion springs may be arranged to accommodate spring of the ground wheels independently of each other. My improved torsion spring may also be used to advantage in a wide variety of other uses wherever it is desired to connect two members for torsional control of their relative movement.

It is an object of my invention to provide an improved method of making a torsional spring whereby the cost of the assembly is minimized and the life of the spring increased.

Another object is to provide a torsional spring of improved strength and wherein improved resistance to failure is afforded.

While the torsion spring assembly may comprise a rubber body frictionally or mechanically connected to the relatively movable members of the oscillatory joint, I preferably provide for bonding the rubber or other plastic material to the joint members during the usual vulcanizing and curing of the rubber so that a unit is formed of the rubber and the metallic members bonded thereto.

One feature of my invention comprises an improved method of forming the spring with concentric metallic structures between which the rubber body is located, one of the structures being discontinuous for the purpose of placing the rubber under radial compressive stress to increase its life and improve its torsional action. This discontinuous structure, as a feature of my invention, serves as a connecting support for the spring without requiring additional enclosing structures for attaching the spring to one of the relatively oscillatory members.

Another feature of my invention resides in a method of forming a discontinuous or segmental sleeve for the rubber body, the rubber being radially protruded at the gap between the sleeve segments and bonded thereto to reduce the stress in the rubber at this critical region.

Further objects and advantages of my invention will be apparent from the following description of one illustrative embodiment thereof, reference being had to the accompanying drawing in which:

Fig. 1 is a side elevational view somewhat diagrammatically showing my invention applied to a vehicle wheel suspension.

Fig. 2 is an enlarged side elevational view showing my torsion spring as viewed in Fig. 1.

Fig. 3 is a sectional elevational view of the torsion spring taken as indicated by line 3—3 of Fig. 2.

Fig. 4 is a sectional view of a portion of the torsion spring illustrating the method of molding the same.

Fig. 5 is a similar view illustrating the spring after cooling from the molding process.

Referring to the drawing I have illustrated my invention in the form of a torsion spring unit or assembly A for yieldingly mounting the vehicle frame structure B on the front ground wheel C. The wheel mounting may be of any suitable type such, for example, as illustrated in the copending application of Woolson et al., Serial No. 238,421, filed November 2, 1938. With such arrangement, the wheel is carried by a crank arm 10 and is additionally stabilized by the cooperating parallelogram system comprising the system of pivotal links 11, 12. As the wheel rises and falls, the torsion spring A yieldingly resists such movement and, by its torsion action, supports the frame on the wheel C by reason of the wheelcarrying arm 10.

The spring A has inner and outer structures or parts, one of which is securely attached to arm 10 and the other of which is secured to frame B. By preference, an inner structure comprising a metallic cylindrical sleeve or hollow shaft 13 is continuous and is bonded to the annular rubber body 14. This body is externally embraced by an enclosing structure comprising a discontinuous cylindrical sleeve formed of segments 15, 16 preferably two in number such that each is a hemi-cylinder likewise bonded to the body 14.

Each of the segments 15, 16 has a pair of diametrically opposite outwardly extending clamping lugs or abutment flanges 17, 18 respectively, serving as means to draw the segments together to compress the rubber body 14 and also to attach the spring unit to the frame B. For this purpose each pair of companion flanges 17, 18 has a pair of aligned openings 19, 20 for receiving a fastener assembly 21.

The spring is vulcanized as shown in Fig. 4, the segments 15, 16 being eccentrically spaced by removable filler blocks 22 between each pair of flanges 17, 18 such that after the unit is removed from the mold (not shown) and the blocks 22 removed, the shrinkage of the rubber will bring the segments toward each other to the Fig. 5 condition to relieve the rubber of tension stress while still preserving a gap 23 between the flanges. When the unit is assembled by fasteners 21, this gap is closed thereby placing the rubber under initial radial compressive stress.

As shown in Fig. 4, the blocks 22 do not entirely conform with, or complete the approximately cylindrical surface represented at 24 interiorly of segments 15, 16. On the other hand, the blocks have their inner ends disposed outwardly from this surface 24 so that when the rubber is molded, a radial rubber rib 25 will be formed bonded to and around the rounded shoulders 26 at the juncture between flanges 17, 18 and the main body portions of the segments 15, 16. The ribs 25 do not project so far as to prevent the flanges from being clamped together as in Fig. 2 but the arrangement is such that tendency of the rubber to fail along the flanged edges of the segments, when subjected to torsion, is prevented. Thus the bond is increased at the gap and the rubber stress is reduced at this critical region. When the flanges 17, 18 are drawn together, a portion of the rubber in ribs 25 flows mostly endwise sufficiently to permit the clamping action.

The segments 15, 16 form a clamp to compress the body 14 and also form the outer supporting shell for the body. If desired, the unit may be connected to one of the oscillating joint members by connection and support solely at the flanges 17, 18. In practice, for a wheel suspension, the frame B is preferably provided with a fabricated hollow welded cross brace 26 having a bottom hemi-cylindrical member 27 thereof which serves to receive the segment 16 and transfer the vertical loads between the wheel and frame. The member 27 has flanges 28 abutting flanges 17, each of the pairs of fasteners 21 serving to clamp together one set of the flanges 26, 17 and 18. For additional rigidity one or both segments may be ribbed. In the drawings I have illustrated segment 16 as formed with the reverse-bent rib 29 extending around the segment body and continuing to the flanges 18 between the associated pairs of fasteners 21.

I do not limit my invention, in the broader aspects thereof, to any particular combination and arrangement of parts such as shown and described for illustrative purposes since various modifications will be apparent from the teachings of my invention and scope thereof as defined in the appended claim.

What I claim is:

The method of making a torsion bearing which comprises assembling a body of vulcanizable plastic material around a shaft and within a pair of rigid hemi-cylindrical segments each having flanges adjacent the terminal edges thereof, introducing a spacer between adjacent flanges of the segment for holding the segments in relation to the shaft, vulcanizing the plastic body in bonded adhesion to said shaft and segments with ribbed portions of said body projecting radially outwardly therefrom to said spacers, removing said spacers while the plastic material cools from the heat of vulcanization to permit the segments to move toward each other during shrinkage of the material, and mounting the assembly with the flanges of the segments clamped together to hold the plastic body under radial compressive stress.

GLENN H. PARKER.